UNITED STATES PATENT OFFICE.

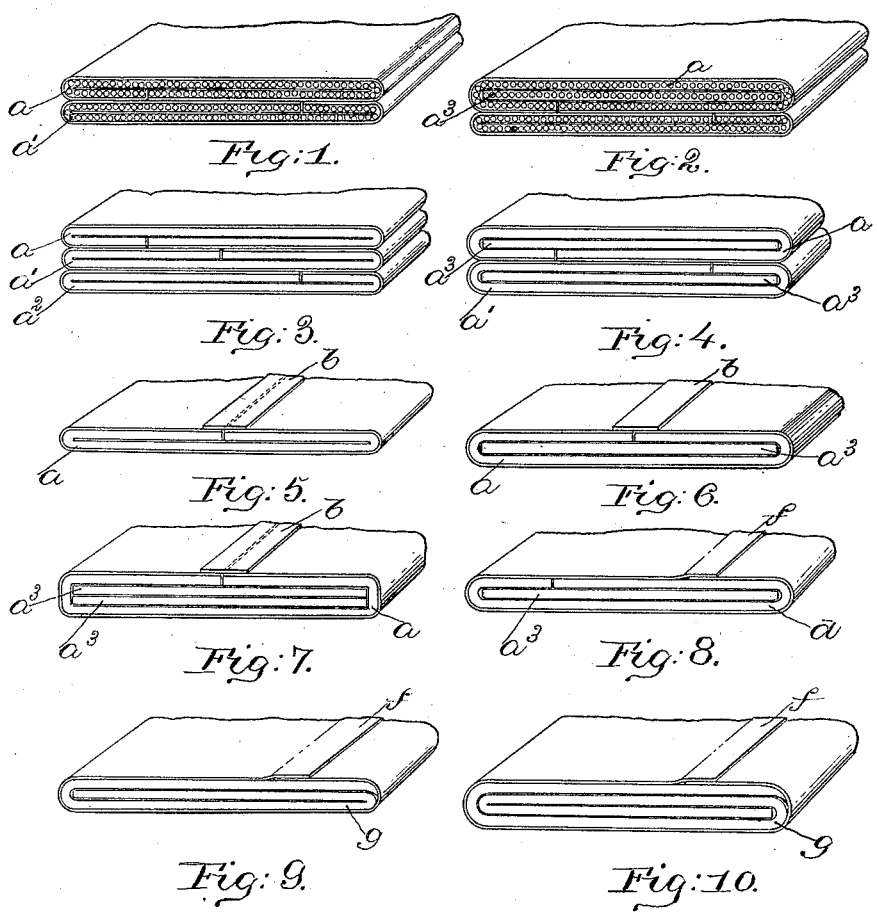

JAMES BENNETT FORSYTH, OF BOSTON, MASSACHUSETTS.

BELTING.

SPECIFICATION forming part of Letters Patent No. 385,703, dated July 10, 1888.

Application filed March 23, 1888. Serial No. 268,256. (No model.)

*To all whom it may concern:*

Be it known that I, JAMES BENNETT FORSYTH, of Boston, in the county of Suffolk and State of Massachusetts, have invented an Improved Belting, of which the following is a specification, reference being had to the accompanying drawings, in which—

Figure 1 is a cross-section of my four-ply belting; Fig. 2, a cross-section of my five-ply belting; Fig. 3, a cross-section of one form of my six-ply belting, and Fig. 4 a cross-section of another form of my six-ply belting.

"Rubber belting," so called, is made from stout woven material whose meshes are first filled with rubber compound by means of what are called "friction-machines," the coating or film of rubber compound thus applied being known as a "friction-coating."

In making a two-ply rubber belt it is customary to friction-coat the duck upon both sides and then apply a heavier coating of rubber (by means of heated calender-rolls) to one side of the friction-coated duck. The duck so friction-coated on both sides and coated upon one side with a coating of rubber compound much thicker than the friction-coating is then cut into strips the width of which is twice that of the belt, and the strip $a$ is then folded with the thicker rubber coating outside, making a two-ply belt, such as is shown in Fig. 5. The three-ply, such as is shown in Fig. 3, is made in the same way, except that a strip, $a^3$, of friction-coated duck of the proper width is placed within the folded single strip $a$, as shown in Fig. 6, and a four-ply belt is made in the same way, except that there are two thicknesses of friction-coated duck, $a^3$, within the folded strip $a$, as shown in Fig. 7. In order to hide the joint between the edges of the outside folded strip, $a$, a strip, $b$, of rubber compound, commonly called a "seam," is applied, covering that joint, as shown in Figs. 5, 6, and 7. This is by far the cheapest and best way of making rubber belting, the chief objection being that the belt should not be used with the "seam," as the rubber strip $b$ is called, next the pulley. In order to avoid this seam, rubber belting is sometimes made of a strip, $d$, of friction-coated duck cut twice the width of the belt and folded, as above described, with one or more strips, $a^3$, of friction-coated duck within the folded strip $d$, and then a sheet of rubber compound, $f$, is wrapped around the whole, as shown in Fig. 8; but while this avoids the use of the seam or strip $b$ to cover the joint, and is in appearance rather better than the seamed belting shown in Figs. 5, 6, and 7, it is, in truth, but little, if at all, better.

Rubber belting has also been made by cutting the strip $g$ of friction-coated duck three times as wide as the belt where a three-ply belt is to be made, or four times as wide where a four-ply belt is to be made, and then folding it, as shown in Figs. 9 and 10, the strip $g$ after being so folded being covered, as before described, with a sheet of rubber compound, $f$. This method of folding (shown in Figs. 9 and 10) is much more expensive than that shown in Figs. 5 to 8, and the application of the finishing-sheet of rubber compound, $f$, to the friction-coated duck, $d$ or $g$, as in Figs. 8, 9, and 10, is also more expensive and more liable to imperfections in the finished product than when the rubber coating is applied by hot calender rolls on one side of the friction-coated duck $a$, as in Figs. 5, 6, and 7.

My improved belting is made of friction-coated duck coated upon one side with the thicker rubber coating and folded in the usual way; but two of these folded strips, $a\ a'$, are then laid together and pressed firmly in contact with each other, so that the rubber compound forming the thicker coating adheres, and the whole is then vulcanized together, making a four-ply belt, as shown in Fig. 1. To make a five-ply belt, one of the two strips—for example, $a$—has a strip, $a^3$, of friction-coated duck within it, as in Fig. 2. To make a six-ply belt, these folded strips $a\ a'\ a^2$, each coated upon one side with the thicker coating of rubber, are pressed firmly together, so that they adhere, and then vulcanized, making the belt shown in Fig. 3, or two folded strips, $a\ a'$, each with a filling-strip, $a^3$, of friction-coated duck, are united and vulcanized together, as in Fig. 4.

It will now be clear that in my improved belting I do away with the seam or strip $b$, (shown in Figs. 5, 6, and 7,) and yet am enabled to apply the thicker rubber coating, by means of calender rolls, instead of as shown in Figs.

8, 9, and 10. Moreover, the butt-joints in the folded strips *a a'* are greatly strengthened, and the edges of my belt are also stronger than are the edges of the old forms of multi-ply belts shown.

I am aware of the patent to Broadnax, No. 340,280, of 1886, and also that Fig. 8 of the drawings of that patent shows a number of paper strips, each folded substantially as my separate strips are folded, and sewed together to form a belt, and I disclaim everything shown in that patent.

My belt differs, essentially, from all others in that a number of distinct belts, each having a coating of vulcanizable compound, are vulcanized together to form a multi-ply belt, the woven-sheet material of each of the component belts being separated from the woven-sheet material of the other component belts by an elastic material—that is, by the two coatings of vulcanized compound, which become practically one mass when vulcanized.

What I claim as my invention is—

The improved belting above described, in which there are two or more strips, *a a'*, each coated with rubber or its equivalent and folded into a distinct belt with a vulcanizable coating, these distinct belts being united and vulcanized together and forming a multi-ply belt, substantially such as described.

JAMES BENNETT FORSYTH.

Witnesses:
J. E. MAYNADIER,
JOHN R. SNOW.